(12) United States Patent
Buck (10) Patent No.: US 11,491,551 B2
(45) Date of Patent: Nov. 8, 2022

(54) DAMPING APPARATUS AND TOOL-HOLDING APPARATUS WITH SUCH A DAMPING APPARATUS

(71) Applicant: Wohlhaupter GmbH, Frickenhausen (DE)

(72) Inventor: Guenter Buck, Huelben (DE)

(73) Assignee: WOHLHAUPTER GMBH, Frickenhausen (DE)

( * ) Notice: Subject to any disclaimer, the term of this patent is extended or adjusted under 35 U.S.C. 154(b) by 151 days.

(21) Appl. No.: 16/720,265

(22) Filed: Dec. 19, 2019

(65) Prior Publication Data
US 2020/0147698 A1 May 14, 2020

Related U.S. Application Data

(63) Continuation of application No. PCT/EP2018/069312, filed on Jul. 16, 2018.

(30) Foreign Application Priority Data

Jul. 19, 2017 (DE) ...................... 10 2017 116 326.3

(51) Int. Cl.
*B23B 29/02* (2006.01)
*B23B 27/00* (2006.01)
(Continued)

(52) U.S. Cl.
CPC .......... *B23B 29/022* (2013.01); *B23B 27/002* (2013.01); *B23B 31/02* (2013.01); *B23B 2250/16* (2013.01); *B23C 5/003* (2013.01); *B23Q 3/12* (2013.01)

(58) Field of Classification Search
CPC . B23B 29/022; B23B 2250/16; B23B 27/002; B23B 3/02; B23B 31/02;
(Continued)

(56) References Cited

U.S. PATENT DOCUMENTS 3,690,414 A * 9/1972 Aggarwal .......... B23Q 11/0032
188/378
3,774,730 A 11/1973 Maddux
(Continued)

FOREIGN PATENT DOCUMENTS

CN 1886223 12/2006
CN 101554666 10/2009
(Continued)

OTHER PUBLICATIONS

Canadian Intellectual Property Office, Canadian Examination Report, dated Feb. 18, 2021, 3 pages, Quebec Canada.
(Continued)

*Primary Examiner* — Eric A. Gates
*Assistant Examiner* — Paul M Janeski
(74) *Attorney, Agent, or Firm* — Hahn Loeser + Parks LLP; Scott M. Oldham, Esq.

(57) ABSTRACT

A damping apparatus is provided for damping vibrations of a tool-holding apparatus during machining of a workpiece. The damping apparatus comprises a damping body having two ends on which a respective damping device is arranged, which comprises a bearing pin rigidly connected to the damping body and a bearing bush that surrounds the bearing pin in the circumferential direction. An annular space filled with a damping fluid is arranged between the bearing pin and the bearing bush, which annular space is sealed in the axial direction by two elastically deformable sealing rings. The two sealing rings each comprise first and second abutment regions as well as a resilient intermediate region arranged therebetween. The first abutment region is bonded to the bearing pin and the second abutment region is bonded to the bearing bush. The intermediate region is elastically deformable relative to the bearing pin and the bearing bush.

20 Claims, 3 Drawing Sheets

(51) Int. Cl.
　　　*B23B 31/02*　　　(2006.01)
　　　*B23C 5/00*　　　(2006.01)
　　　*B23Q 3/12*　　　(2006.01)

(58) Field of Classification Search
　　　CPC ... B23Q 11/0035; B23Q 3/12; F16F 15/1428;
　　　　　　F16F 7/108; B23C 2250/16; B23C 5/003
　　　See application file for complete search history.

(56) References Cited

U.S. PATENT DOCUMENTS

| | | | |
|---|---|---|---|
| 3,897,956 A * | 8/1975 | Kurio | F01C 19/08 |
| | | | 277/357 |
| 5,810,528 A | 9/1998 | O'Connor et al. | |
| 6,619,165 B2 | 9/2003 | Perkowski | |
| 7,490,536 B2 | 2/2009 | Murakami et al. | |
| 7,661,912 B2 | 2/2010 | Onozuka et al. | |
| 8,308,404 B2 | 11/2012 | Ostermann et al. | |
| 8,708,620 B2 | 4/2014 | Sasaki et al. | |
| 8,734,070 B2 | 5/2014 | De Souza Filho | |
| 8,899,891 B2 | 12/2014 | Freyermuth et al. | |
| 9,027,720 B2 | 5/2015 | Ogata | |
| 9,079,256 B2 | 7/2015 | Freyermuth et al. | |
| 2005/0109182 A1 | 5/2005 | Murakami et al. | |
| 2006/0275090 A1 | 12/2006 | Onozuka et al. | |
| 2009/0257838 A1 | 10/2009 | Ostermann et al. | |
| 2012/0003055 A1 | 1/2012 | Sasaki et al. | |
| 2015/0375304 A1 | 12/2015 | Frota de Souza Filho | |
| 2015/0375305 A1 | 12/2015 | Frota de Souza Filho | |
| 2016/0146288 A1 | 5/2016 | Freyermuth et al. | |
| 2016/0214182 A1 | 7/2016 | Eichelberger | |

FOREIGN PATENT DOCUMENTS

| | | | |
|---|---|---|---|
| CN | 102575745 | 7/2012 | |
| CN | 206065451 | 4/2017 | |
| DE | 2933726 | 3/1981 | |
| DE | 10239670 | 3/2004 | |
| DE | 112015003078 | 4/2017 | |
| EP | 0571490 | 1/1995 | |
| EP | 1248692 | 9/2004 | |
| EP | 1535682 | 6/2005 | |
| EP | 1693131 | 8/2006 | |
| EP | 1677932 | 12/2008 | |
| JP | H0631509 | 2/1994 | |
| JP | 4305558 | 7/2009 | |
| JP | 4305558 B2 * | 7/2009 | ........ H01M 8/04201 |
| JP | 2015009286 | 1/2015 | |
| WO | 9637338 | 11/1996 | |
| WO | 9710912 | 3/1997 | |
| WO | 0245891 | 6/2002 | |
| WO | 03093696 | 11/2003 | |
| WO | 2008002145 | 1/2008 | |
| WO | 2008105664 | 9/2008 | |
| WO | 2015082362 | 6/2015 | |

OTHER PUBLICATIONS

China National Intellectual Property Administration, Notification of First Office Action, dated Oct. 10, 2020, 6 pages, Beijing China.
Indian Intellectual Property Patent Office, Indian Examination Report, dated Mar. 8, 2021, 7 pages, New Delhi Indian.
Korean Intellectual Property Patent Office, Office Action, dated Mar. 30, 2021, 5 pages, Korea.

* cited by examiner

DAMPING APPARATUS AND TOOL-HOLDING APPARATUS WITH SUCH A DAMPING APPARATUS

This application is a continuation of international application number PCT/EP2018/069312 filed on 16 Jul. 2018 and claims the benefit of German application number 10 2017 116 326.3 filed on 19 Jul. 2017, which are incorporated herein by reference in their entirety and for all purposes.

BACKGROUND OF THE INVENTION

The invention relates to a damping apparatus for passively damping vibrations of a tool-holding apparatus during the machining of a workpiece, wherein the damping apparatus comprises a damping body having a first end and a second end, and wherein a respective damping device is arranged at the two ends, which damping device comprises a bearing pin that is rigidly connected to the damping body and a bearing bush that surrounds the bearing pin in the circumferential direction, wherein an annular space that is filled with a damping fluid is arranged between the bearing pin and the bearing bush, which annular space is sealed by two elastically deformable sealing rings arranged at an axial distance from each other in relation to a longitudinal axis of the damping apparatus.

For machining workpieces, in particular workpieces made of metal, tool-holding apparatuses are used which are able to be coupled to a machine spindle of a machine tool directly or using a separate interface part and which are able to bear a tool for machining the workpiece, for example a turning tool, boring tool, or milling tool. Tool-holding apparatuses of that kind may be configured in the form of boring bars. The tool-holding apparatuses may have a length that is a multiple of the diameter thereof. This leads to a reduction in the stiffness of the tool-holding apparatuses and may result in the tool-holding apparatuses being caused to vibrate during the machining of a workpiece. The vibrations may transfer to the tool arranged on the tool-holding apparatuses and impair the machining quality. For example, the vibrations may degrade the surface quality of the workpiece and may also lead to workpieces that are not dimensionally stable. Moreover, the tool may also be damaged by such vibrations.

In order to counteract such vibrations, damping apparatuses for passively damping the vibrations are known, which may be integrated into a tool-holding apparatus. For this purpose, the tool-holding apparatus may comprise a cavity in which a damping apparatus may be arranged. In U.S. Pat. No. 3,774,730 A, a damping apparatus is proposed for this purpose, having a cylindrical damping body, the ends of which are of conical configuration and each comprise a circumferential annular groove in the circumferential direction, in which groove an O-ring is arranged. The mounting of the damping body is effected by way of the elastically configured O-rings which each abut with their outer side remote from the damping body against a pressure plate of the damping apparatus. One of the two pressure plates is mounted so as to be moveable in the axial direction and may be displaced relative to the damping body by means of an adjusting screw in order to thereby vary the bias acting on the O-rings. This results in a change in the damping properties of the damping apparatus. An optimal adjustment of the bias may enable an effective vibration damping. However, adjusting the bias is often difficult for the user and entails the risk of a misadjustment.

In U.S. Pat. No. 7,661,912 B2, for passively damping vibrations of a tool-holding apparatus, a damping apparatus with a damping body is proposed, which bears a respective damping device at its first end and at its second end. The damping devices each have a bearing pin which is rigidly connected to the damping body and is surrounded in the circumferential direction by a bearing bush. The bearing bush is arranged at a radial distance from the bearing pin such that an annular space forms between the bearing pin and the bearing bush. The annular space accommodates a viscous damping fluid and is sealed in the axial direction by two sealing rings arranged at an axial distance from each other. The damping characteristics of the damping apparatus may be adjusted by setting the axial distance between the O-rings. With an optimal adjustment, an effective vibration damping may be achieved, though the risk of misadjustments exists even in this kind of embodiment of the damping apparatus.

SUMMARY OF THE INVENTION

In accordance with an embodiment of the invention, a damping apparatus of the kind stated at the outset is provided, such that an effective vibration damping can be achieved without manual adjustment by the user.

In accordance with an embodiment of the invention, a damping apparatus of the generic kind is provided, wherein the two sealing rings each comprise a first abutment region and a second abutment region as well as a resilient intermediate region, wherein the first abutment region is materially bonded to the bearing pin and the second abutment region is materially bonded to the bearing bush, and wherein the intermediate region is arranged between the two abutment regions and is elastically deformable relative to the bearing pin and relative to the bearing bush.

In the damping apparatus in accordance with the invention, the passive damping of vibrations is effected by the combined use of elastically deformable sealing rings and a damping fluid. The sealing rings have a dual function, as they, for one, seal, pair-wise, an annular space which accommodates a damping fluid, and, for another, exert a resilient effect which influences the damping characteristics of the damping apparatus. The material bond of the sealing rings to a bearing pin and a bearing bush has the advantage that the annular space filled with the sealing fluid is able to be reliably sealed. Even under the effect of the vibrations of the sealing body, there is practically no risk that damping fluid leaks out of the annular space.

Moreover, the material bond has the advantage that the damping characteristics of the damping apparatus are calculable and thus predictable and reproducible, provided that the sealing rings have a first abutment region materially bonded to the bearing pin, a second abutment region materially bonded to the bearing bush, and an intermediate region arranged between the abutment regions. The first abutment region is arranged on the ring inside of the sealing rings and the second abutment region is arranged on the ring outside of the sealing rings.

The first abutment region preferably dips into a receiving groove of the bearing pin.

The second abutment region preferably dips into a receiving groove of the bearing bush.

Due to their material bond to the bearing pin and to the bearing bush, respectively, the two abutment regions contribute only slightly to the resilient effect of the sealing rings. The resilient effect of the sealing rings is ensured primarily by the intermediate region which is arranged in the radial direction between the two abutment regions and thus in a region between the ring inside and the ring outside.

The sealing rings may be configured in particular in such a way that the intermediate region dips neither into a receiving groove of the bearing pin nor into a receiving groove of the bearing bush.

The intermediate region is deformable relative to the bearing pin and relative to the bearing bush and exerts a resilient effect which can be calculated in advance and, in combination with further influencing variables, which are also calculable and predeterminable in advance, like, for example, the mass of the damping body, the kind of damping fluid being used, and the length and width of the annular space, determines the damping characteristics of the damping apparatus. The damping characteristics of the damping apparatus in accordance with the invention may thus be predetermined in the factory of the damping apparatus and a manual adjustment of each individual damping apparatus by the user is not necessary. The damping apparatus may be produced in large quantities with practically constant damping properties.

The material bond between the abutment regions of the sealing rings and the bearing pin and the bearing bush of the damping devices, respectively, may be configured, for example, in the form of an adhesive bond by the first abutment region of the sealing rings each being adhesively bonded to a bearing pin and by the second abutment region of the sealing rings each being adhesively bonded to a bearing bush.

The abutment regions of the sealing rings may, in cross section, form the shape of a polygon, for example, in particular the shape of a triangle or quadrilateral. The abutment regions of the sealing rings may be configured to be, for example, rectangular, square, trapezoidal, or diamond-shaped in cross section.

In a preferred embodiment of the invention, the two abutment regions of the sealing rings have the shape of a circular section in cross section. They thus preferably each form a partial area of a circle which is delimited by a circular arc and a chord. Along the circular arc, the sealing rings maybe materially bonded to the bearing pin and to the bearing bush, respectively. In particular, an abutment area may extend along the circular arc, with which abutment area the sealing rings abut in area contact against the bearing pin and against the bearing bush, respectively. The intermediate region of the sealing rings may adjoin the chord.

It is particularly advantageous if the circular arc of the abutment regions extends over an angular range of at least 120°, preferably over an angular range of 150° to 180°. With an angular range of 180°, the abutment regions of the sealing rings are of semicircular configuration in cross section.

It is advantageous if the two abutment regions of the sealing rings are of identical configuration.

The abutment regions are preferably each accommodated by an annular groove of a bearing pin and of a bearing bush, respectively. The annular groove may be of U-shaped or C-shaped configuration in cross section, for example.

It is favorable if the abutment regions abut in area contact against the wall of the respective annular groove. The cross sectional area of the annular groove advantageously corresponds to the cross sectional area of the abutment region that dips into the annular groove.

The resilient intermediate region arranged between the two abutment regions has a predeterminable cross sectional geometry which simplifies a calculation of the damping properties of the damping apparatus. Provision may be made, for example, for the resilient intermediate region to be of trapezoidal or barrel-shaped configuration in cross section.

In a particularly preferable embodiment of the invention, the resilient intermediate region is of rectangular or square configuration in cross section.

As already mentioned, the damping devices each arranged at an end of the damping body comprise a bearing pin which is rigidly connected to the damping body.

The bearing pin may be connected to the damping body in one piece, i.e., together with the damping body, it forms a one-piece component that consists of a uniform material.

Alternatively, the bearing pin may form a separate component which is mechanically connected to the damping body. In particular, the bearing pin may be screwed to the damping body.

The bearing pin may consist of a more cost-effective material than the damping body.

For example, the bearing pin may consist of steel.

During machining of the workpiece, the damping body vibrates both in the axial direction and in the radial direction in relation to the longitudinal axis of the damping apparatus. The vibrations are transmitted from the damping body to the bearing pin that is rigidly connected to the damping body. From the bearing pin, the vibrations may be transmitted via the sealing rings and the damping fluid to the bearing bush, wherein the vibrations are subject to a damping.

In the transmission of axially oriented vibrations, the sealing rings are subject to a shear stress that is dependent on the amplitude of the axial vibrations. In order to limit the shear load, it is advantageous if the bearing bushes are arranged in the axial direction at a distance from the damping body that is at least 0.3 mm and at most 1 mm.

In particular, provision may be made for the axial distance between the bearing bushes and the damping body to be 0.3 mm to 0.8 mm, for example 0.5 mm to 0.6 mm.

The provision of a distance between the damping body and the bearing bush that is delimited in the axial direction ensures that the bearing bushes fixable in a cavity of a tool-holding apparatus form a stop against which the damping body strikes when the axial vibrations have a very high amplitude. The shear stress of the elastically deformable sealing rings is thereby limited.

A minimum distance of 0.3 mm between the damping body and the bearing bushes has proven to be advantageous for also effectively damping axial vibrations by means of the damping apparatus.

The sealing rings each delimiting an annular space in the axial direction preferably consist of an elastically deformable material, in particular of an elastomer material.

It is advantageous if the sealing rings consist of a silicone material. Silicone material has a considerable temperature stability, such that the sealing rings reliably withstand the temperature load that is caused by the vibrations of the sealing body.

The damping fluid is preferably a silicone oil.

The damping body preferably consists of a heavy metal, in particular of a heavy metal in the form of a composite material.

The damping body preferably has a tungsten content of at least 90%.

The density of the damping body is advantageously at least 17 g/cm$^3$.

Provision may be made for the two sealing rings of each of the damping devices to be of identical configuration.

The damping devices that are arranged at the two ends of the damping body are advantageously of identical configuration.

In an advantageous embodiment of the invention, the damping body is of cylindrical, in particular circular cylindrical configuration.

The length of the damping body, i.e. the axial extent of the damping body, is preferably greater than the diameter of the damping body.

It is particularly advantageous if the damping devices arranged at the two ends of the damping body are releasably connectible to the damping body.

In particular, provision may be made for the damping devices to be screwable to the damping body.

It is advantageous if the bearing pins arranged at the two ends of the damping body are configured as hollow pins.

The configuration of the bearing pins in the form of hollow pins makes it possible to guide a respective connecting screw through the bearing pins in order to rigidly connect the bearing pin to the damping body by means of the connecting screw.

It is particularly advantageous if the damping devices arranged at the ends of the damping body each form an interchangeable damping module.

The damping modules arranged at the ends of the damping body are preferably of identical configuration. This allows for the damping modules to be manufactured in greater quantities and for the production costs to thereby be reduced.

The invention also relates to a tool-holding apparatus with a holding body and with a damping apparatus of the kind described above. The holding body has a central cavity which extends from a cavity base to a face side of the holding body and in which the damping apparatus is arranged, wherein the bearing bushes of the damping apparatus are fixed on the holding body. As already mentioned, by using the damping apparatus arranged in the cavity of the holding body, an effecting damping can be achieved of vibrations that occur during the use of the tool-holding apparatus due to machining a workpiece.

It is advantageous if the bearing bushes of the damping apparatus each are connected to the holding body by means of at least one positive-locking element. For example a pin or a screw, in particular a cylindrical or taper pin, for example a threaded taper pin, may be used as a positive-locking element.

In an advantageous embodiment of the tool-holding apparatus in accordance with the invention, within the cavity of the holding body, a tool-receiving part adjoins the damping apparatus in the direction toward the face side of said holding body, wherein the tool-receiving part extends at least up to the face side of the holding body and is configured for releasably connecting to a tool for machining a workpiece. By means of the tool-receiving part, a tool that is used for machining a workpiece, for example a boring tool, may be fixed on the face side of the holding body. Provision may also be made for the holding body to comprise a receptacle which adjoins the damping apparatus for directly releasably connecting to the tool. In such embodiments, the damping apparatus is arranged at a small distance from the tool. Due to the small distance, vibrations that occur during the machining of the workpiece are able to be particularly effectively damped.

On its rear side remote from the face side, the holding body comprises, in an advantageous embodiment of the invention, a connecting element which is configured to releasably connect to an interface part for connecting the tool-holding apparatus to the machine spindle of a machine tool.

Provision may also be made for the tool-holding apparatus to be directly connectible to a machine spindle. For the purposes of the connection, the tool-holding apparatus may comprise, for example, a steep taper or hollow shaft taper which is arranged on the rear side of the holding body remote from the face side.

The tool-holding apparatus, together with the interface part, the tool-receiving part and the tool, preferably forms a modular tool system. The interface part may constitute a first module of the tool system, which enables a connection of the tool system to the machine spindle of a machine tool. The tool-holding apparatus may adjoin the first module in the form of a second module into which a damping apparatus of the kind stated above is integrated and which bears a tool-receiving part on the face side. A third module in the form of a tool, for example a milling tool or a boring tool, which is used for machining a workpiece, may adjoin the second module.

The subsequent description of an advantageous embodiment of the invention serves in conjunction with the drawing for further explanation.

DETAILED DESCRIPTION OF THE INVENTION

Schematically depicted in the drawing is an advantageous embodiment of a tool-holding apparatus in accordance with the invention, which is designated as a whole with the reference numeral 10. An advantageous embodiment of a damping apparatus 25 in accordance with the invention, likewise schematically depicted, is integrated into the tool-holding apparatus.

The tool-holding apparatus comprises an elongate holding body 12 which is circular cylindrical in the depicted embodiment and which comprises a cylindrical cavity 16 aligned coaxially to a longitudinal axis 14 of the tool-holding apparatus 10. The cavity 16 extends from a cavity base 17 to a face side 18 of the holding body 12.

On its rear side 19 remote from the face side 18, the holding body 12 forms a connecting element which, in the embodiment depicted, is configured as a connecting pin 20.

The damping apparatus 25 is arranged in the cavity 16. Within the cavity 16, a tool-receiving part 28 adjoins the side of the damping apparatus 25 that is remote from the cavity base 17. The tool-receiving part 28 has a recess 30 aligned coaxially to the longitudinal axis 14. The tool-receiving part 28 enables the tool-holding apparatus 10 to connect to a tool 32 depicted schematically in FIG. 4, and the connecting pin 20 enables the tool-holding apparatus 10 to connect to an interface part 34 which is depicted schematically in FIG. 4 and by means of which the tool-holding apparatus 10 may be connected to the machine spindle of a machine tool. The tool-holding apparatus 10, in combination with the tool-receiving part 28, the tool 32, and the interface part 34, forms a modular tool system 36 which is able to be set into rotation about the longitudinal axis 14 for machining a workpiece.

In order to damp vibrations occurring during machining, the damping apparatus 25 is integrated into the tool-holding apparatus 10. The damping apparatus 25 comprises an elongate damping body 28 which consists of a heavy metal composite material. In the embodiment depicted, the damping body 38 consists of a composite material with a tungsten content of at least 90%. The density of the damping body 38 in the embodiment depicted is at least 17 g/cm³.

In the embodiment depicted, the damping body 38 is of circular cylindrical configuration and has a first end 39, a second end 40, and a lateral surface 41. In the embodiment depicted, the length of the damping body 38, i.e. the extent thereof in parallel to the longitudinal axis 14, is greater than its diameter transverse to the longitudinal axis 14. However, the invention is not limited to an embodiment of that kind, rather the length of the damping body could also be smaller than its diameter. The damping body 38 is aligned coaxially to the longitudinal axis 14, wherein the lateral surface 41 adopts a distance from an inner wall 43 of the cavity 16. The distance is favorably at most 2 mm, preferably 0.5 to 0.8 mm.

The damping body 38 comprises a central through bore 44 which is passed through by a coolant conduit 45. Coolant is able to be supplied via the coolant conduit 45 to the tool 32, arranged on the face side 18 of the holding body 12 by means of the tool-receiving part 28, during machining of a workpiece.

The mounting of the damping body 38 in the cavity 16 is effected by means of a first damping device 47 arranged at the first end 39 and a second damping device 48 arranged at the second end 40. In the embodiment depicted, the two damping devices 47, 48 are of identical configuration and each form an interchangeable damping module which is releasably connectible, in particular screwable, to the damping body 38.

Figure 1:
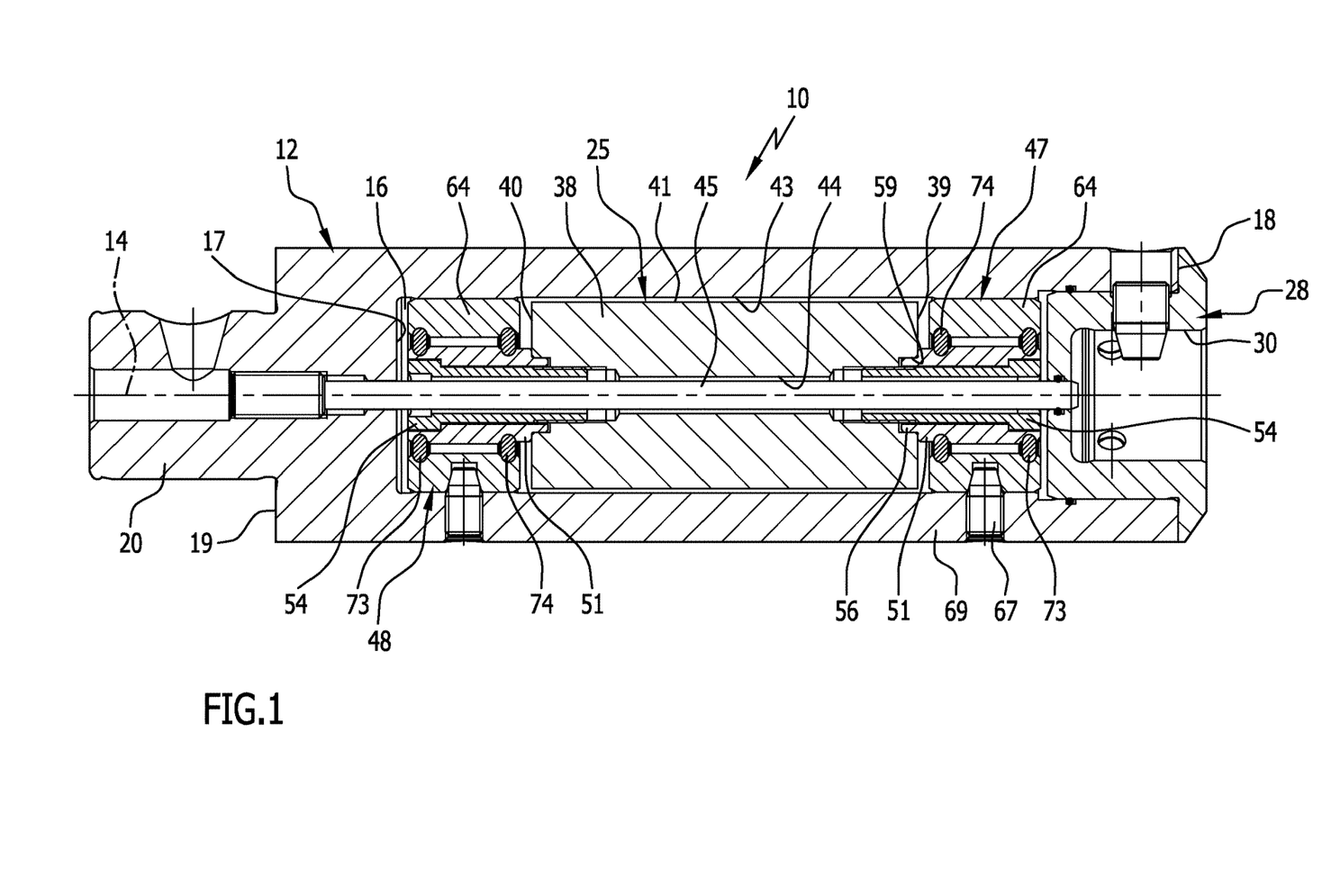
FIG. 1: shows a sectional view of a tool-holding apparatus with an integrated damping apparatus, wherein the damping apparatus comprises two damping devices of identical configuration, between which a damping body is arranged.
Figure 2:
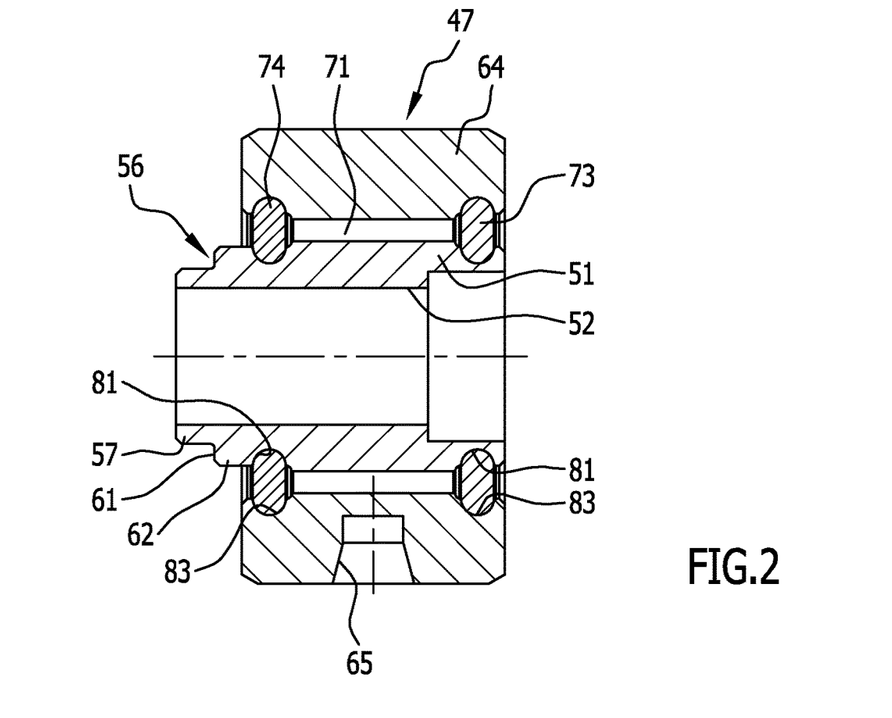
FIG. 2: shows a sectional view of a damping device of the damping apparatus from FIG. 1.

The first damping device 47 is depicted enlarged in FIG. 2 and is described in more detail in the following, wherein said descriptions apply in the same way to the identically configured second damping device 48.

The damping device 47 comprises a bearing pin 51 in the form of a hollow pin which has a central through-opening 52. The through-opening 52 is passed through by a hollow screw 54, by means of which the bearing pin 51 is rigidly and releasably connected to the damping body 38.

The bearing pin 51 comprises a collar 56 which faces toward the damping body 38 and dips with an end section 57 into a face-side recess 59 of the damping body 38, and which collar 56 is adjoined by a widened collar section 62 via a step 61 directed radially outwardly. The bearing pin 51 is supported on the damping body 38 by means of the step 61.

The bearing pin 51 is surrounded in the circumferential direction by a bearing bush 64 which is of hollow-cylindrical configuration and comprises a lateral recess 65. In the assembled state of the damping apparatus 25, a positive-locking element, which is configured as a threaded taper pin 67 in the embodiment depicted, dips into the lateral recess 65. The threaded taper pin 67 passes through a side wall 69 of the holding body 12, which delimits the cavity 16 in the circumferential direction. The bearing bush 64 is fixed in the cavity 16 by means of the threaded taper pin 67.

Extending between the bearing pin 51 and the bearing bush 64 is an annular space 71 which is filled with a damping fluid that is not depicted in the illustration for achieving a better overview. In the embodiment depicted, a silicone oil is used as damping fluid.

In the axial direction, the annular space 71 is delimited and sealed by a first sealing ring 73 and a second sealing ring 74. The two sealing rings 73, 74 ensure that the damping fluid cannot escape the annular space 71.

The two sealing rings 73, 74 are of identical configuration and each are elastically deformable. In the embodiment depicted, the two sealing rings 73, 74 consist of a silicone material.

Figure 3:
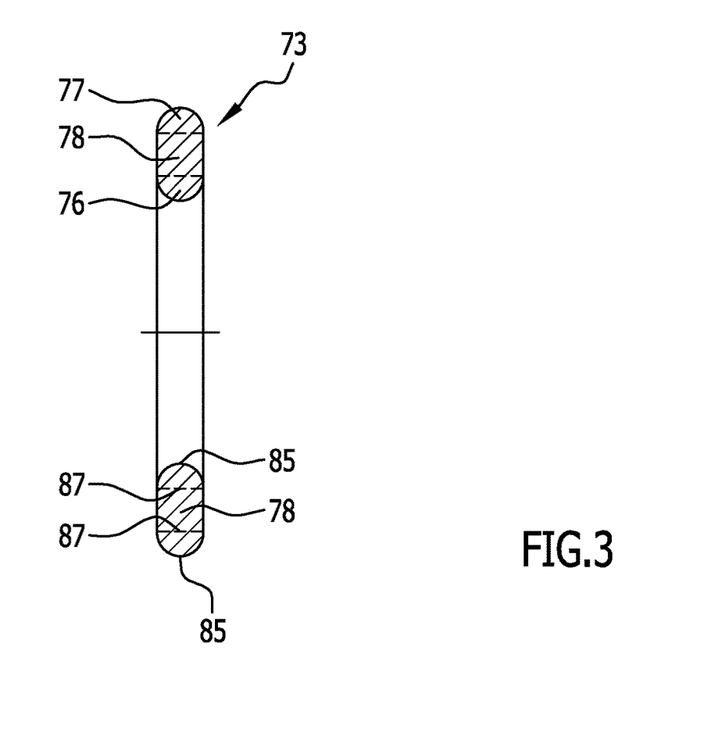
FIG. 3: shows a sectional view of a sealing ring of the damping device from FIG. 2.

As is clear in FIG. 3, the two sealing rings 73, 74 each have a first abutment region 76, a second abutment region 77, and an intermediate region 78 arranged between the first abutment region 76 and the second abutment region 77. The first abutment region 76 of each sealing ring 73, 74 dips into an outer annular groove 81 which surrounds the bearing pin 51 in the circumferential direction and, in the embodiment depicted, accommodates the first abutment region 76 in a positive-locking manner. The second abutment region 77 of each sealing ring 73, 74 dips into an inner annular groove 83 formed on the inside in the bearing bush 64, which annular groove 83, in the embodiment depicted, accommodates the second abutment region 77 in a positive-locking manner. In total, the bearing pin 51 has two outer annular grooves 81 arranged at an axial distance from each other and the bearing bush 64 has two inner annular grooves 83 arranged at an axial distance from each other. The two abutment regions 76, 77 are of identical configuration and each have in cross section the shape of a circular section that is delimited by a circular arc 85 and a chord 87. Extending along the circular arc 85 is the abutment face with which the sealing rings 73, 77 abut in area contact against the bearing pin 51 and against the bearing bush 61, respectively, with the interposition of an adhesive layer that is not depicted in the illustration, and the intermediate region 78 adjoins the chord 87.

The first abutment region 76 is materially bonded to the bearing pin 51, in the embodiment depicted the first abutment region 76 is adhesively bonded to the bearing pin 51. In a corresponding manner, the second abutment region 77 is materially bonded to the bearing bush 64, in the embodiment depicted the second abutment region 77 is adhesively bonded to the bearing bush 64.

The intermediate region 78 arranged between the two abutment regions 76, 77 has a rectangular cross sectional area in the embodiment depicted and is elastically deformable both relative to the bearing pin 51 and relative to the bearing bush 64. By providing the intermediate region, it is ensured that the two sealing rings 73, 74 exert a resilient effect despite the material bond of the abutment regions 76, 77 to the bearing pin 51 and the bearing bush 64, respectively.

As already discussed, the bearing pin 51 abuts directly against the damping body 38 in the region of the step 61 of the collar 56 and is rigidly connected to the damping body 38. Vibrations of the damping body 38 are thus transmitted directly to the bearing pin 51.

In contrast to the bearing pin 51, the bearing bush 64 adopts a distance from the damping body 38 in the axial direction, wherein the distance is at most 1 mm. In particular, provision may be made for the distance to be about 0.3 mm to about 0.7 mm, preferably 0.5 mm.

Vibrations from the tool-holding apparatus 10 during the machining of a workpiece are able to be effectively damped by means of the damping apparatus 25. The damping effect is determined, among other things, by the mass of the damping body 38, the length and width of the annular space 71, the kind of damping fluid, and the resilient effect of the sealing rings 73, 74. Because the sealing rings 73, 74 are materially bonded to the bearing pin 51 and to the bearing bush 64, the resilient effect of the abutment regions 76, 77 dipping into the annular grooves 81 and 83, respectively, in a positive-locking manner is negligibly small to a first approximation and the resilient effect of the sealing rings 73, 74 is predetermined substantially by the respective intermediate region 78 which, in the embodiment depicted, has a rectangular cross sectional area in the non-deformed state, and is impaired in its elastic deformation neither by the bearing pin 51 nor by the bearing bush 64. This makes it possible to calculate the resilient effect of the sealing rings 73, 74 as well as the damping properties as a whole of the damping apparatus 25 and thus to predetermine said damping properties in the factory by selecting the mass of the damping body 38, the kind of damping fluid as well as the length and width of the annular space 71 that is filled with damping fluid, and by selecting the material properties of the sealing rings 73, 74. A manual adjustment of the damping apparatus 25 by the user is not necessary.

Figure 4:
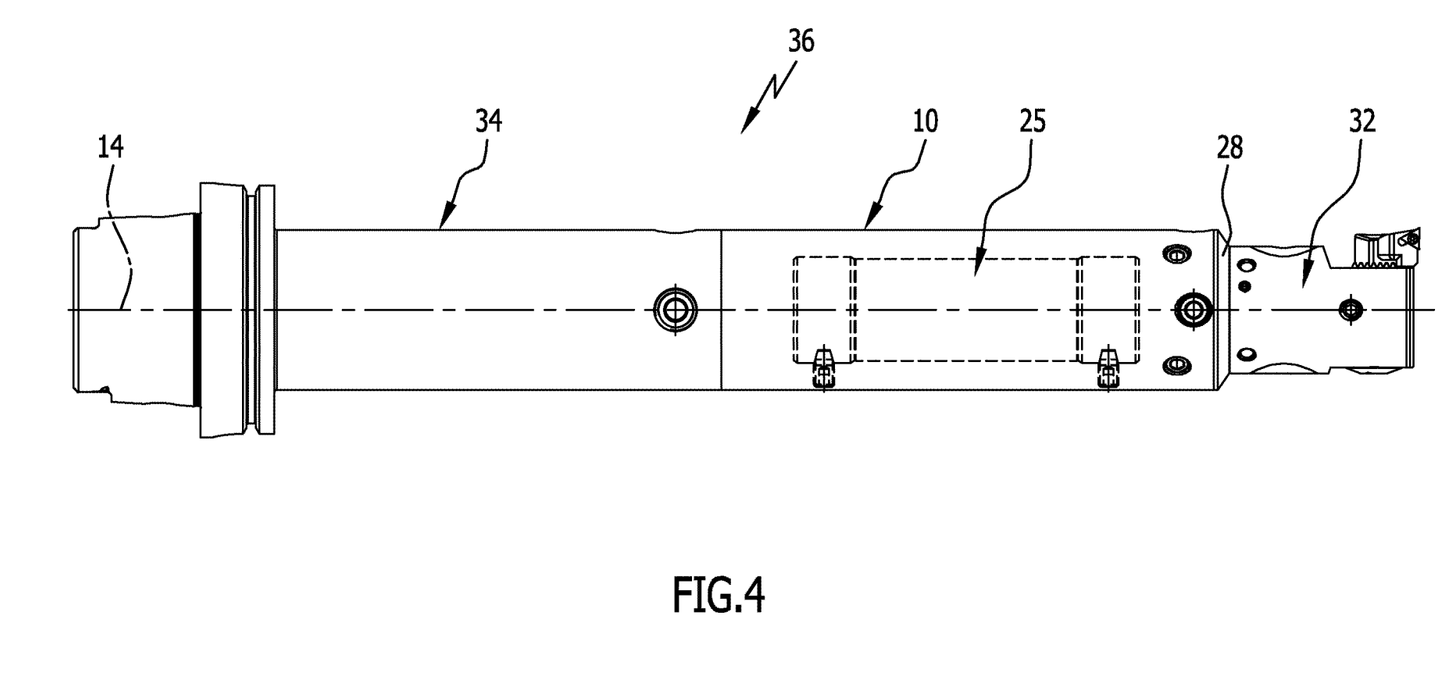
FIG. 4: shows a side view of a modular tool system with a tool-holding apparatus from FIG. 1.

As already mentioned, the tool-holding apparatus 10 with an integrated damping apparatus 25 and integrated tool-receiving part 28 forms an interchangeable module which, in combination with the tool 32 and the interface part 34, forms a modular tool system 36. Different interface parts 34 may hereby be used, which enable a coupling to differently configured receiving apparatuses of machine spindles. In the same way, differently configured tools 32 may be used in order to machine a workpiece in different ways. Vibrations occurring while machining can be effectively damped by means of the damping apparatus 25.

What is claimed is:

1. Damping apparatus for damping vibrations of a tool-holding apparatus during the machining of a workpiece, wherein the damping apparatus has predetermined damping properties set by a particular damping body having a predetermined mass and a first end and a second end, and first and second damping devices arranged on the first and second ends of the damping body, each comprising a bearing pin that moves with the damping body and a fixed bearing bush spaced from the damping body that surrounds the bearing pin in the circumferential direction, wherein arranged between the bearing pin and the fixed bearing bush is an annular space which is filled with a predetermined damping fluid and is sealed by two sealing rings arranged at a predetermined axial distance from each other in relation to a longitudinal axis of the damping apparatus, wherein the two sealing rings each provide predetermined elastic deformation relative to the bearing pin and bearing bush such that the damping properties of the damping apparatus is not adjustable in association with the predetermined damping body and first and second damping devices.

2. Damping apparatus in accordance with claim 1, wherein the bearing bush is positioned to limit the axial movement of the damping body in the axial direction.

3. Damping apparatus in accordance with claim 1, wherein the bearing bush is arranged at an axial distance from the damping body which is at least 0.3 mm and at most 1 mm.

4. Damping apparatus in accordance with claim 1, wherein the bearing pin of each damping device is formed as a separate hollow pin.

5. Damping apparatus in accordance with claim 1, wherein bearing pin is a different material than the damping body.

6. Damping apparatus in accordance with claim 1, wherein the two sealing rings of each damping device are of identical configuration.

7. Damping apparatus in accordance with claim 1, wherein the two damping devices are of identical configuration.

8. Damping apparatus in accordance with claim 1, wherein the damping devices are releasably connectible to the damping body.

9. Damping apparatus in accordance with claim 1, wherein the damping devices each form an interchangeable damping module which can be removed and replaced with another damping module.

10. Damping apparatus for damping vibrations of a tool-holding apparatus during the machining of a workpiece, wherein the damping apparatus has predetermined non-adjustable damping properties set by a damping body having a predetermined mass and a first end and a second end, and damping devices arranged on the first and second ends comprising a bearing pin that moves with the damping body and a fixed bearing bush spaced from the damping body that surrounds the bearing pin in the circumferential direction, wherein arranged between the bearing pin and the bearing bush is an annular space which is filled with a predetermined damping fluid and is sealed by two sealing rings arranged at a predetermined axial distance from each other in relation to a longitudinal axis of the damping apparatus, wherein the two sealing rings each provide predetermined elastic deformation relative to the bearing pin and bearing bush and, wherein the two sealing rings comprise a first abutment region and a second abutment region as well as a resilient intermediate region, wherein the resilient effect of the sealing rings is predetermined substantially by the respective intermediate region of each of the two sealing rings which is elastically deformable in a predetermined manner.

11. Damping apparatus in accordance with claim 10, wherein the intermediate regions of the sealing rings have a predeterminable cross sectional geometry.

12. Damping apparatus in accordance with claim 10, wherein the abutment regions are each fixed with an annular groove formed in the bearing pin and bearing bush, respectively.

13. Damping apparatus in accordance with claim 10, wherein the resilient intermediate region is configured to be rectangular or square in cross section.

14. Damping apparatus in accordance with claim 10, wherein the first abutment region is materially bonded to the bearing pin and the second abutment region is materially bonded to the bearing bush.

15. Damping apparatus in accordance with claim 10, wherein the abutment regions are each formed as a partial area of a circle delimited by a circular arc and the circular arc of the abutment regions extends over an angular range of at least 120°.

16. Tool-holding apparatus with a holding body which comprises a central cavity, wherein the cavity extends from a cavity base to a face side of the holding body, and wherein a damping apparatus for damping vibrations of a tool-holding apparatus during the machining of a workpiece has predetermined non-adjustable damping properties set by a damping body having a predetermined mass and a first end and a second end, and damping devices arranged on the first and second ends comprising a bearing pin that moves with the damping body and a fixed bearing bush spaced from the damping body that surrounds the bearing pin in the circumferential direction, wherein arranged between the bearing pin and the bearing bush is an annular space which is filled with a predetermined damping fluid and is sealed by two sealing rings arranged at a predetermined axial distance from each other in relation to a longitudinal axis of the damping apparatus, wherein the two sealing rings each provide predetermined elastic deformation relative to the bearing pin and bearing bush is arranged in the cavity, and wherein the bearing bushes of the damping apparatus are fixed on the holding body.

17. Tool-holding apparatus in accordance with claim 16, wherein the bearing bushes are each connected to the holding body by means of at least one positive-locking element.

18. Tool-holding apparatus in accordance with claim 16, wherein, within the cavity, the damping apparatus is adjoined in the direction toward the face side of the holding body by a tool-receiving part which extends to the face side of the holding body and is configured to releasably connect to a tool for machining a workpiece.

19. Tool-holding apparatus in accordance with claim 16, wherein the holding body comprises a connecting element on its rear side remote from the face side, which connecting element is configured to releasably connect to an interface part for connecting the tool-holding apparatus to a machine spindle of a machine tool.

20. Damping apparatus for damping vibrations of a tool-holding apparatus during the machining of a workpiece, wherein the damping apparatus comprises a damping body having a first end and a second end, and wherein arranged on the two ends is a respective damping device which comprises a bearing pin that moves with the damping body and a bearing bush that surrounds the bearing pin in the circumferential direction, wherein arranged between the bearing pin and the bearing bush is an annular space which is filled with a damping fluid and is sealed by two elastically deformable sealing rings arranged at an axial distance from each other in relation to a longitudinal axis of the damping apparatus, wherein the two sealing rings each comprise a first abutment region and a second abutment region as well as a resilient intermediate region, wherein the first abutment region is materially bonded to the bearing pin and the second abutment region is materially bonded to the bearing bush, and wherein the resilient intermediate region of is arranged between the two abutment regions and is elastically deformable-relative to the bearing pin and relative to the bearing bush, and wherein the abutment regions are each accommodated by an annular groove of a bearing pin and of a bearing bush, respectively.

* * * * *